United States Patent Office 3,751,519
Patented Aug. 7, 1973

3,751,519
COMPATIBLE POLYCARBONATE-SILOXANE COMPOSITION
Edgar E. Bostick, Scotia, N.Y., and Donald B. G. Jaquiss, New Harmony, Ind., assignors to General Electric Company
No Drawing. Filed July 29, 1971, Ser. No. 167,483
Int. Cl. C08g 47/10, 17/13
U.S. Cl. 260—824                                                        4 Claims

ABSTRACT OF THE DISCLOSURE

A composition consisting of in admixture, a polycarbonate and 0.01–2.0 weight percent of a particular solid monomeric crystallized cyclosiloxane compound. Particularly, the siloxane employed herein is octaphenylcyclotetrasiloxane.

This invention is directed to a polycarbonate composition consisting of in admixture an aromatic polycarbonate and a particular siloxane. More specifically, the particular siloxane is a monomeric solid compound.

It is known to use organopolysiloxane in admixture with polycarbonates to provide a composition having good mold release properties when the composition is so employed for molding applications (U.S. Pat. 2,999,835). While the direct results of mold release are extremely beneficial, the incorporation or use of the disclosed organopolysiloxanes are most difficult. First of all, they are generally liquids or gum elastic type additives which make them very difficult to add or mix with solid polycarbonate resin or to extrude the composition with preparing injection molding pellets. In addition, many of the usual known polysiloxanes are not compatible with polycarbonates.

It has now been discovered that the above drawbacks can be overcome by employing a particular siloxane with the polycarbonate. The particular siloxane employed herein is a monomeric solid compound, is completely compatible with the polycarbonate and because it is in solid form, it is vastly easier to handle or to use.

Therefore it is an object of this invention to provide a polycarbonate resin having excellent mold release properties.

It is another object of this invention to provide a polycarbonate composition having in admixture a particular siloxane.

These and other objects of this invention will become apparent from the following detailed description thereof.

Briefly, according to this invention, the foregoing and other objects are obtained by admixing an aromatic polycarbonate with 0.01 to about 2.0 weight percent of a particular siloxane based on the weight of the polycarbonate. An example of the particular siloxane employed herein is a solid monomeric octaphenylcyclotetrasiloxane.

The following examples are set forth to illustrate more clearly the principle and practice of this invention to those skilled in the art. Unless otherwise specified, where parts or percents are mentioned they are parts or percents by weight.

EXAMPLE I

To 100 parts of a polycarbonate prepared by reacting essentially equimoles of bisphenol A (2,2-bis(4-hydroxyphenyl)propane) and phosgene in the presence of an acid acceptor and a catalyst, which polycarbonate has an intrinsic viscosity of about 0.50, add 1 part of octaphenylcyclotetrasiloxane in solid form. The siloxane mixed very easily with the polycarbonate. The mixture is then fed to an extruder and pelletized.

The pellets are then injection molded into discs of about 3 inches in diameter and about ⅛ inch thick. The molded disc is easily released from the solid without sticking and the piece is transparent.

EXAMPLE II

Example I is repeated except that dimethylpolysiloxane is employed which siloxane is a liquid. To mix the siloxane is a liquid. To mix the siloxane with the polycarbonate requires heating the polymer to about 230° C. on a hot plate and then adding a few drops of the liquid polysiloxane. The polymer turns to a milky-opaque appearance.

The composition is then molded into discs which are opaque and which easily release from the mold without any sticking.

The instant invention is directed to a polymer composition consisting of in admixture an aromatic polycarbonate and a particular siloxane. The particular siloxane employed herein is one which is a crystallized solid monomeric compound and is employed in amounts from 0.01 to about 2.0 weight percent based on the weight of the polycarbonate. In general the solid monomeric crystallized siloxanes compound employed herein is one which is a phenyl substituted cyclosiloxane compound or an alkyl substituted phenyl substituted cyclosiloxane and wherein the phenyl rings can contain alkyl radicals of 1–4 carbon atoms. Those that can be employed in the examples in place of the octaphenylcyclotetrasiloxane with essentially the same results are hexaphenylcyclotetrasiloxane, 2,2-dimethyl-4,4,6,6-tetraphenylcyclotrisiloxane, 2,2,4,4-tetramethyl-6,6-diphenylcyclotrisiloxane, and 2-methyl - 2,4,4,6,6 - pentaphenylcyclotrisiloxane. In the practice of this invention, the preferred monomeric siloxane is octaphenylcyclotetrasiloxane.

The composition of this invention can be readily mixed in any convenient manner since the materials are both solids and are easily compatible. When preparing injection molding pellets the polycarbonate and the siloxane can be either premixed or fed independently to the feed hopper of an extruder. Because the siloxane employed herein is compatible with the polycarbonate, thorough mixing is easily accomplished with no difficulty of separation or agglomerations forming. In addition small amounts of the siloxane achieve excellent results of mold release during molding of the composition. As stated previously, the amount of the siloxane compound is 0.01 to about 2.0 weight percent based on the weight of the polycarbonate and preferably 0.1 to about 1.0 weight percent thereof.

The aromatic polycarbonate employed herein can be those prepared from reacting a dihydric phenol and a carbonate precursor. It can also include the addition of minor amounts of other additives or minor amounts of other reactive monomeric constituents. It can also include copolymers of two of more different dihydric phenols. Examples of dihydric phenols that can be employed to prepare the polycarbonates employed herein are bis(4-hydroxyphenyl)-methane, 2,2 - bis(4-hydroxyphenyl)-propane, 2,2-bis(4-hydroxy-3-methylphenyl)-propane, 4,4-bis(4-hydroxyphenyl)-heptane, 2,2-bis(4-hydroxy, 3,5-dichlorophenyl)-propane, 2,2-bis(4-hydroxy 3,5-dibromophenyl)-propane, etc., dihydric phenol ethers such as bis (4-hydroxyphenyl)-ether, bis(3,5-dichloro - 4 - hydroxyphenyl)-ether, etc., dihydroxydiphenyls such as p,p'-dihydroxydiphenyl, 3,3'-dichloro-4,4'-dihydroxydiphenyl, etc., dihydroxyaryl sulfones such as bis(4-hydroxyphenyl)-sulfone, bis(3,5 - dimethyl - 4 - hydroxyphenyl) - sulfone, etc., dihydroxy benzenes, resorcinol, hydroquinone, halo- and alkyl-substituted dihydroxy benzenes such as 1,4-dihydroxy - 2 - chlorobenzene, 1,4 - dihydroxy - 2,5 - dichlorobenzene, 1,4 - dihydroxy - 3 - methylbenzene, etc., and dihydroxy diphenyl sulfoxides such as bis(4-hydroxyphenyl) - sulfoxide, bis(3,5 - dibromo-4-hydroxyphenyl)-sulfoxide, etc. A variety of additional dihydric phenols are also available to provide carbonate polymers and are disclosed in U.S. Pats. 2,999,835, 3,028,365, and 3,153,008. It is of course possible to employ two or more different dihydric phenols or a copolymer of a dihydric phenol with glycol or with hydroxy or acid terminated polyester, or with a dibasic acid in the event a carbonate copolymer or interpolymer rather than a homopolymer is desired for use in the preparation of the aromatic carbonate polymers of this invention.

As stated previously, the reaction may be carried out in the presence of an acid acceptor which may be either an organic or an inorganic compound. A suitable organic acid acceptor is a tertiary amine and includes such materials as pyridine, triethylamine, dimethylaniline, tributylamine, etc. The inorganic acid acceptor may be one which can either be an hydroxide, a carbonate, a dicarbonate or a phosphate of an alkali or alkaline earth metal.

The molecular weight regulators which are also employed in carrying out the process for preparing the aromatic polycarbonate resins can be such molecular weight regulators as phenol, cyclohexanol, methanol, para-tertiarybutylphenol, para-bromophenol, etc. Preferably, para-tertiary-butylphenol is employed as the molecular weight regulator.

It will thus be seen that the objects set forth above among those made apparent from the preceding description are efficiently attained, and since certain changes may be made in carrying out the above process and in the composition set forth without departing from the scope of this invention, it is intended that all matters contained in the above description shall be interpreted as illustrative and not in a limiting sense.

What is claimed is:
1. A polycarbonate composition consisting of in admixture an aromatic polycarbonate and 0.01–2.0 weight percent of a solid monomeric crystallized cyclosiloxane compound selected from the group consisting of phenyl substituted cyclosiloxane and alkyl substituted phenyl substituted cyclosiloxane.
2. The polycarbonate composition of claim 1 wherein the cyclosiloxane is octaphenylcyclotetrasiloxane.
3. The composition of claim 2 wherein the monomeric octaphenylcyclotetrasiloxane is present in an amount of 0.3 to 1.0 weight percent.
4. The composition of claim 1 wherein the aromatic polycarbonate is the reaction product of 2,2-bis(4-hydroxyphenyl)propane.

References Cited
UNITED STATES PATENTS

| | | | |
|---|---|---|---|
| 2,999,835 | 9/1961 | Goldberg | 260—824 |
| 3,087,908 | 4/1963 | Caird | 260—824 |

JOHN C. BLEUTGE, Primary Examiner

W. J. BRIGGS, Sr., Assistant Examiner

U.S. Cl. X.R.
260—29.1 B, 47 XA